US012687215B2

(12) United States Patent
Matsui et al.

(10) Patent No.: US 12,687,215 B2
(45) Date of Patent: Jul. 21, 2026

(54) VIBRATION DAMPING DEVICE

(71) Applicant: SUMITOMO RIKO COMPANY LIMITED, Komaki (JP)

(72) Inventors: Hirotaka Matsui, Komaki (JP); Mutsumi Muraoka, Komaki (JP); Satoshi Umemura, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 411 days.

(21) Appl. No.: 18/218,652

(22) Filed: Jul. 6, 2023

(65) Prior Publication Data

US 2024/0077128 A1     Mar. 7, 2024

(30) Foreign Application Priority Data

Sep. 7, 2022   (JP) ................................ 2022-142396

(51) Int. Cl.
| | |
|---|---|
| *F16F 13/00* | (2006.01) |
| *B60K 5/12* | (2006.01) |
| *F16F 13/08* | (2006.01) |

(52) U.S. Cl.
CPC ............ *F16F 13/08* (2013.01); *B60K 5/1208* (2013.01); *F16F 2226/04* (2013.01); *F16F 2230/0005* (2013.01)

(58) Field of Classification Search
CPC .......... F16F 13/10; F16F 13/102; F16F 13/08; F16F 13/085; F16F 13/103; F16F 13/105; F16F 13/108; F16F 13/18
See application file for complete search history.

(56) References Cited

U.S. PATENT DOCUMENTS

| | | | | | |
|---|---|---|---|---|---|
| 4,607,828 | A | * | 8/1986 | Bodin ..................... | F16F 13/10 |
| | | | | | 267/140.13 |
| 5,183,243 | A | * | 2/1993 | Matsumoto ............. | F16F 13/10 |
| | | | | | 267/140.13 |

(Continued)

FOREIGN PATENT DOCUMENTS

| | | | |
|---|---|---|---|
| JP | H07-190130 A | 7/1995 | |
| JP | 2004-301221 A | 10/2004 | |
| WO | WO-2015153711 A1 * | 10/2015 | ............ F16F 13/103 |

OTHER PUBLICATIONS

Feb. 25, 2026 Office Action issued in Japanese Patent Application No. 2022-142396.

(Continued)

*Primary Examiner* — Nicholas J Lane
(74) *Attorney, Agent, or Firm* — Oliff PLC

(57) ABSTRACT

A vibration damping device including first and second attachment members connected by a main rubber elastic body. The second attachment member includes a main rubber outer member having a first tubular part fastened to an outer peripheral end of the main rubber elastic body, and a drawing fitting having a second tubular part attached externally about the first tubular part of the main rubber outer member. The first tubular part is axially inserted in the second tubular part, and the second tubular part is reduced in diameter to be fitted to an outer circumferential surface of the first tubular part. Fitted portions of the first tubular part and the second tubular part include respective tapered parts decreasing in diameter in a direction of dislodgment that is opposite to a direction of insertion of the first tubular part in the second tubular part.

8 Claims, 3 Drawing Sheets

(56)        References Cited

U.S. PATENT DOCUMENTS

| | | | | |
|---|---|---|---|---|
| 5,386,977 | A | * | 2/1995 | Quast ..................... F16F 13/26 |
| | | | | 267/140.13 |
| 5,971,376 | A | * | 10/1999 | Mori ..................... F16F 13/10 |
| | | | | 267/140.13 |
| 5,988,611 | A | * | 11/1999 | Takashima ............ F16F 13/103 |
| | | | | 267/140.13 |
| 11,472,279 | B2 | * | 10/2022 | Seo ..................... B60K 5/1208 |
| 2004/0188899 | A1 | * | 9/2004 | Ichikawa .............. F16F 13/264 |
| | | | | 267/140.3 |
| 2006/0113717 | A1 | * | 6/2006 | Sato ................... F16F 13/1409 |
| | | | | 267/273 |
| 2008/0237952 | A1 | * | 10/2008 | Nishi ..................... F16F 13/10 |
| | | | | 267/140.13 |
| 2013/0264756 | A1 | * | 10/2013 | Daito ..................... F16F 13/08 |
| | | | | 267/140.13 |
| 2015/0260254 | A1 | * | 9/2015 | Furumachi ............ F16F 13/103 |
| | | | | 267/140.13 |

OTHER PUBLICATIONS

Apr. 29, 2026 Office Action issued in Chinese Patent Application No. 202310797547.8.

* cited by examiner

VIBRATION DAMPING DEVICE

INCORPORATED BY REFERENCE

The disclosure of Japanese Patent Application No. 2022-142396 filed on Sep. 7, 2022 including the specification, drawings and abstract is incorporated herein by reference in its entirety.

BACKGROUND

1. Technical Field

The present disclosure relates to a vibration damping device applied to an engine mount for an automobile and a method of manufacturing the vibration damping device.

2. Description of the Related Art

Conventionally, there are known vibration damping devices adapted for use in engine mounts and the like, which provide vibration damping linkage between a power unit of an automobile and a vehicle body. The vibration damping device has a structure in which, for example, a first attachment member and a second attachment member are connected by a main rubber elastic body, as described in Japanese Unexamined Patent Publication No. JP-A-H07-190130.

SUMMARY

Meanwhile, in JP-A-H07-190130, a tubular connecting fitting is fastened to the outer peripheral end of the main rubber elastic body. In a state where a fitting tube part having a tubular shape is placed externally about the connecting fitting, the fitting tube part is subjected to a diameter reduction process, so that the connecting fitting and the fitting tube part are mutually fixed to form the second attachment member.

However, in the process of fitting and fixing the fitting tube part and the connecting fitting by means of the diameter reduction of the fitting tube part as described above, it is conceivable that force exerted on the connecting fitting from the fitting tube part during the diameter reduction may push out the connecting fitting with respect to the fitting tube part in the direction of dislodgment, causing the positions of the connecting fitting and the fitting tube part in the axial direction to be relatively shifted.

It is therefore one object of the present disclosure to provide a vibration damping device of novel structure which is able to suppress relative movement of the main rubber outer member with respect to the drawing fitting in the direction of dislodgment when the main rubber outer member and the drawing fitting, which constitute the second attachment member, are fixed by the diameter reduction, and a novel manufacturing method of the vibration damping device.

Hereinafter, preferred embodiments for grasping the present disclosure will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present disclosure, various other preferred embodiments can be realized without being limited to those described below.

A first preferred embodiment provides a vibration damping device comprising: a first attachment member; a second attachment member; and a main rubber elastic body connecting the first and second attachment members, wherein the second attachment member comprises: a main rubber outer member including a first tubular part fastened to an outer peripheral end of the main rubber elastic body; and a drawing fitting including a second tubular part attached externally about the first tubular part of the main rubber outer member, the first tubular part of the main rubber outer member is inserted in the second tubular part of the drawing fitting in an axial direction, and the second tubular part is reduced in diameter (by a diameter reduction process) to be fitted to an outer circumferential surface of the first tubular part, and fitted portions of the first tubular part and the second tubular part include respective tapered parts decreasing in diameter in a direction of dislodgment that is opposite to a direction of insertion of the first tubular part in the second tubular part.

According to the vibration damping device structured following the present preferred embodiment, when fitting and fixing the drawing fitting to the main rubber outer member by the diameter reduction process, the tapered part provided in the first tubular part of the main rubber outer member and the tapered part provided in the second tubular part of the drawing fitting are fitted together, so that the force to reduce the diameter of the drawing fitting is transmitted to the main rubber outer member with a component force in the direction of insertion into the drawing fitting. Therefore, the main rubber outer member is prevented from becoming dislodged from the drawing fitting toward the side that is opposite to the direction of insertion, thereby inhibiting the main rubber outer member from being shifted in relative position with respect to the drawing fitting.

A second preferred embodiment provides the vibration damping device according to the first preferred embodiment, wherein the tapered part of the first tubular part is provided entirely in the axial direction.

According to the vibration damping device structured following the present preferred embodiment, the tapered part is provided entirely in the first tubular part that is located on the radial inside of the second tubular part. Thus, the alignment of the tapered part of the first tubular part with the tapered part of the second tubular part are facilitated, thereby fitting the tapered parts to each other more reliably.

A third preferred embodiment provides the vibration damping device according to the first or second preferred embodiment, wherein a sealing rubber is interposed between overlapped surfaces of the tapered parts.

According to the vibration damping device structured following the present preferred embodiment, the tapered part of the first tubular part and the tapered part of the second tubular part are pressed against each other via the sealing rubber, so that a component force in the axial direction can be more efficiently exerted on the main rubber outer member. Besides, the sealing rubber can provide a sealing between the overlapped surfaces of the tapered parts.

A fourth preferred embodiment provides a vibration damping device comprising: a first attachment member; a second attachment member; and a main rubber elastic body connecting the first and second attachment members, wherein the second attachment member comprises: a main rubber outer member including a first tubular part fastened to an outer peripheral end of the main rubber elastic body; and a drawing fitting including a second tubular part attached externally about the first tubular part of the main rubber outer member, the first tubular part of the main rubber outer member is inserted in the second tubular part of the drawing fitting in an axial direction, and a sealing rubber is interposed between the first tubular part and the second tubular part, the second tubular part is reduced in diameter (by a diameter reduction process) to be pressed against the sealing rubber and fitted to an outer circumferential surface of the first tubular part, and a portion of the second tubular part that is in contact with the sealing rubber includes a tapered part decreasing in diameter in a direction of dislodgment that is opposite to a direction of insertion of the first tubular part in the second tubular part.

According to the vibration damping device structured following the present preferred embodiment, when attaching the drawing fitting to the main rubber outer member by the diameter reduction process, the tapered part provided in the second tubular part of the drawing fitting is pressed against the sealing rubber interposed between the first tubular part of the main rubber outer member and the second tubular part of the drawing fitting. By so doing, the force to reduce the diameter of the drawing fitting acts on the main rubber outer member not only as a radially inward force but also as a force in the direction of insertion into the drawing fitting. Therefore, the main rubber outer member is prevented from becoming dislodged from the drawing fitting toward the side that is opposite to the direction of insertion, thereby suppressing the shift in relative position of the main rubber outer member with respect to the drawing fitting.

A fifth preferred embodiment provides the vibration damping device according to any one of the first through fourth preferred embodiments, wherein the first tubular part of the main rubber outer member includes a first outer flange projecting radially outward at one axial end of the first tubular part, the second tubular part of the drawing fitting includes a second outer flange projecting radially outward at one axial end of the second tubular part, the tapered part provided to at least one of the first tubular part and the second tubular part gradually decreases in diameter toward the first outer flange and the second outer flange in the axial direction, and a caulking fitting is provided such that the first outer flange and the second outer flange that are overlapped on each other in a state of contact are fixed by caulking by the caulking fitting.

According to the vibration damping device structured following to the present preferred embodiment, the shift in relative position of the main rubber outer member and the drawing fitting in the axial direction is prevented in the direction of insertion of the first tubular part into the second tubular part by the contact of the first outer flange and the second outer flange. Hence, by the fitting between the tapered part of the first tubular part and the tapered part of the second tubular part, the shift in relative position of the main rubber outer member and the drawing fitting in the axial direction is suppressed in the direction of dislodgment of the first tubular part from the second tubular part. This makes it possible to position the main rubber outer member and the drawing fitting on both sides in the axial direction.

Besides, the first outer flange and the second outer flange are fixed by caulking in a state of contact with each other by the caulking fitting, thereby more firmly positioning the main rubber outer member and the drawing fitting in the axial direction.

A sixth preferred embodiment provides the vibration damping device according to any one of the first through fifth preferred embodiments, the vibration damping device comprising a fluid-filled vibration damping device comprising: a pressure-receiving chamber whose wall is partially defined by the main rubber elastic body and an equilibrium chamber whose wall is partially defined by a flexible film, the pressure-receiving chamber and the equilibrium chamber being filled with a non-compressible fluid; and an orifice passage interconnecting the pressure-receiving chamber and the equilibrium chamber, wherein the drawing fitting comprises a diaphragm outer fitting fastened to an outer peripheral end of the flexible film.

The vibration damping device structured according to the present preferred embodiment comprises a fluid-filled vibration damping device in which a non-compressible fluid is sealed inside, and it is more important for the main rubber outer member and the diaphragm outer fitting to be arranged in appropriate relative positions in the axial direction, for example, from the perspective of preventing liquid leakage and the like. Therefore, in the fluid-filled vibration damping device, by adopting the axial positioning of the main rubber outer member and the diaphragm outer fitting by fitting the tapered part, it is possible to prevent troubles such as leakage of the sealed fluid.

A seventh preferred embodiment provides the vibration damping device according to the sixth preferred embodiment, wherein the first tubular part of the main rubber outer member includes a first inner flange projecting radially inward at a lower end of the first tubular part, the second tubular part of the drawing fitting includes a second inner flange projecting radially inward at a lower end of the second tubular part, and the first inner flange and the second inner flange are apart from and opposed to each other in a vertical direction, and a partition partitioning the pressure-receiving chamber and the equilibrium chamber is clasped between the opposed first and second inner flanges.

According to the vibration damping device structured following the present preferred embodiment, the main rubber outer member including the first inner flange and the diaphragm outer fitting including the second inner flange are positioned appropriately in the axial direction by the fitting of the tapered part. Thus, the partition is properly clasped between the first inner flange and the second inner flange, thereby preventing unintended short circuit of the sealed fluid between the pressure-receiving chamber and the equilibrium chamber, generation of noise due to rattling of the partition, and the like.

An eighth preferred embodiment provides a method of manufacturing a vibration damping device including a first attachment member and a second attachment member connected by a main rubber elastic body, the method comprising: preparing a main rubber outer member including a first tubular part to be fastened to an outer peripheral end of the main rubber elastic body, and a drawing fitting including a second tubular part to be attached externally about the first tubular part of the main rubber outer member; inserting the first tubular part into the second tubular part and attaching the drawing fitting to the main rubber outer member; and performing a drawing operation on the second tubular part to impart tapered contours at a portion of the second tubular part that is overlapped on the first tubular part thereby forming a tapered part on the second tubular part, the tapered part decreasing in diameter in a direction of dislodgment that is opposite to a direction of insertion of the first tubular part into the second tubular part, while fitting and fixing the tapered part to an outer circumferential surface of the first tubular part to position the main rubber outer member and the drawing fitting with respect to each other in an axial direction.

According to the method of manufacturing the vibration damping device structured following the present preferred embodiment, when fitting and fixing the second tubular part to the first tubular part by performing a diameter reduction process on the drawing fitting, the second tubular part is reduced in diameter to be imparted tapered contours so that the tapered part is formed, and the tapered part of the second tubular part is fitted and fixed to the outer circumferential surface of the first tubular part. This makes it possible to prevent the main rubber outer member from becoming dislodged from the drawing fitting, thereby positioning the main rubber outer member and the drawing fitting with respect to each other in the axial direction.

According to the present disclosure, when the main rubber outer member and the drawing fitting, which constitute the second attachment member of the vibration damping device, are fixed together by diameter reduction, movement of the main rubber outer member relative to the drawing fitting in the direction of dislodgment can be suppressed.

BRIEF DESCRIPTION OF THE DRAWINGS

The foregoing and/or other objects, features and advantages of the disclosure will become more apparent from the following description of practical embodiments with reference to the accompanying drawings in which like reference numerals designate like elements and wherein.

DETAILED DESCRIPTION OF EMBODIMENTS

Hereinafter, practical embodiments of the present disclosure will be described with reference to the drawings.

Figure 1:
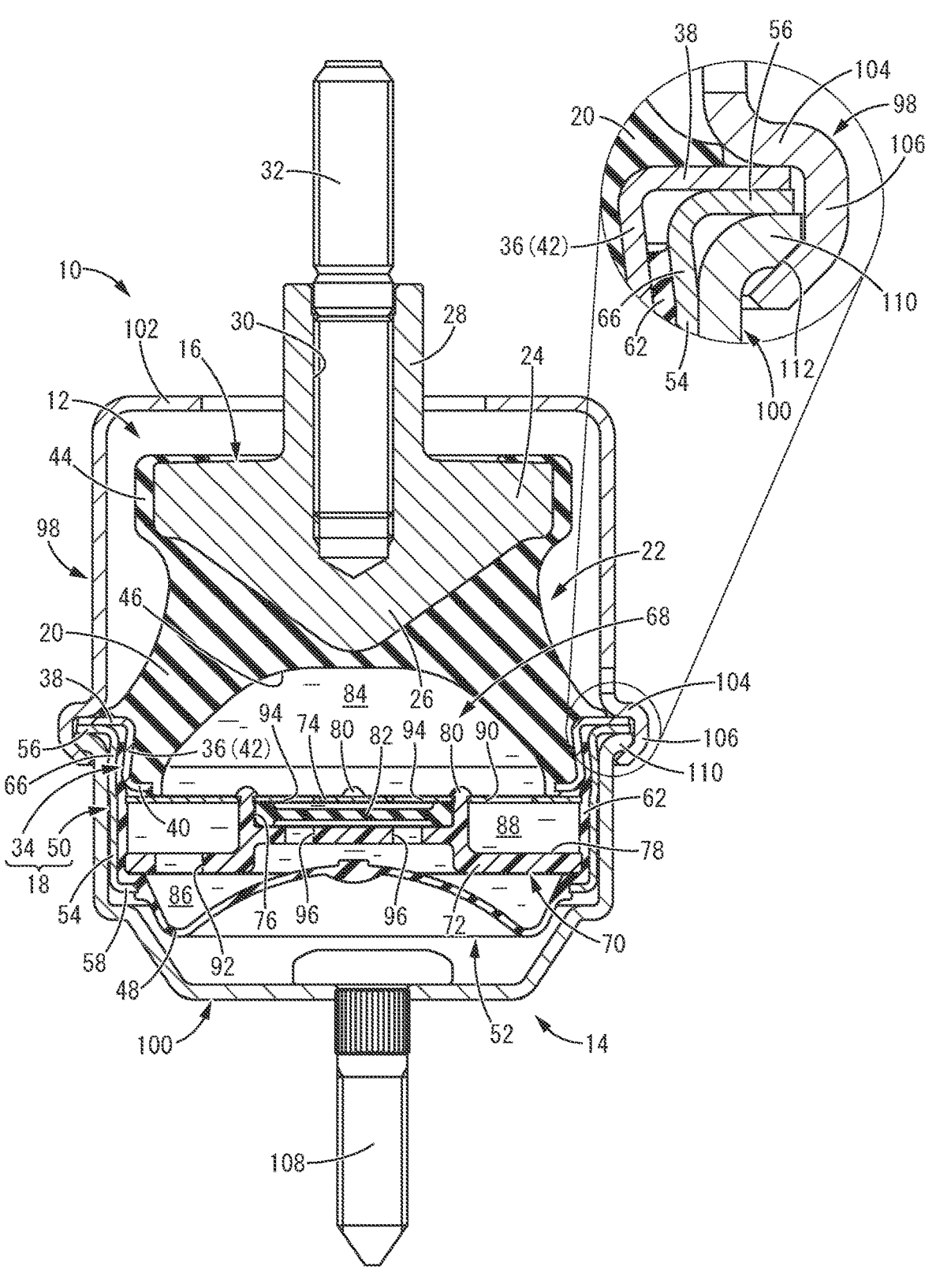
FIG. 1 is a cross sectional view showing a vibration damping device in the form of an engine mount as a first practical embodiment of the present disclosure.

FIG. 1 shows an automotive engine mount 10 serving as a first practical embodiment of a vibration damping device structured in accordance with the present disclosure. The engine mount 10 has a structure in which an outer bracket 14 is attached to a mount body 12. The mount body 12 includes a first integrally vulcanization molded component 22 (see FIG. 2) in which a first attachment member 16 and a second attachment member 18 are connected by a main rubber elastic body 20. In the following description, as a general rule, the vertical direction refers to the vertical direction in FIG. 1, which is the direction of extension of the mount center axis.

The first attachment member 16 is a rigid member formed of metal or the like, integrally comprising an approximately disc-shaped stopper part 24, an approximately inverted cone-shaped fastening part 26 protruding downwardly from the stopper part 24 and decreasing in diameter downwardly, and a screw part 28 protruding upwardly from the stopper part 24 and having an approximately cylindrical shape. The first attachment member 16 has a screw hole 30 opening onto the upper surface of the screw part 28 and extending in the vertical direction, and an implanted bolt 32 is screwed into the screw hole 30 and protrudes upwardly.

Figure 2:
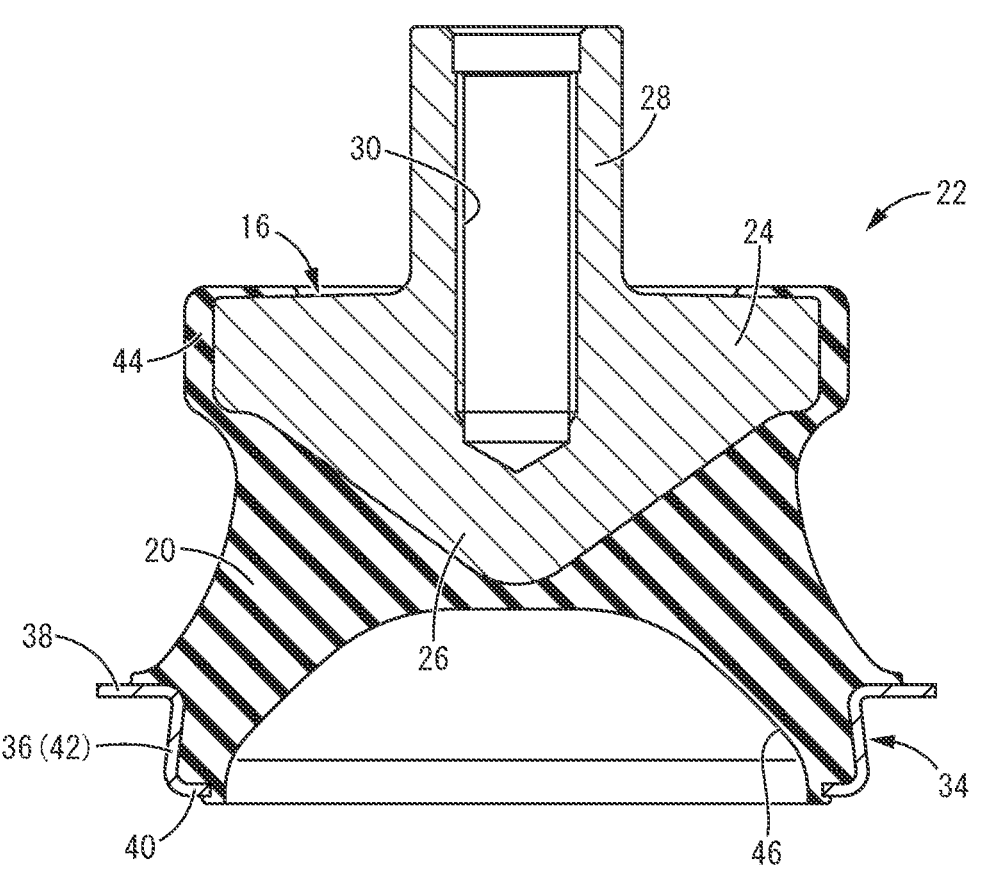
FIG. 2 is a cross sectional view of a first integrally vulcanization molded component constituting the engine mount shown in FIG. 1.

The second attachment member 18 includes a main rubber outer member 34. The main rubber outer member 34, like the first attachment member 16, is a rigid member formed of metal or the like, and is annular in shape with a large diameter. More specifically, the main rubber outer member 34 includes a first tubular part 36 having an approximately tubular shape, and integrally includes a first outer flange 38 projecting radially outward from the upper end of the first tubular part 36 and a first inner flange 40 projecting radially inward from the lower end of the first tubular part 36. As shown in FIG. 2, the first tubular part 36 has a tapered tubular shape overall that decreases in diameter toward the top, and the first tubular part 36 entirely serves as a tapered part in the form of a first tapered part 42. It is desirable that the inclination angle of the first tapered part 42 with respect to the axial direction be within a range of 5° to 30°, so that when a second tapered part 66 described below is fitted, a downward component force can be effectively exerted on the main rubber outer member 34 while the first tapered part 42 and the second tapered part 66 are effectively fitted and fixed. The radial width dimension of the first outer flange 38 is larger than the radial width dimension of the first inner flange 40. The curvature of the curved portion connecting the first tubular part 36 and the first outer flange 38 is larger than the curvature of the curved portion connecting the first tubular part 36 and the first inner flange 40.

The first attachment member 16 and the main rubber outer member 34 are connected by the main rubber elastic body 20. The main rubber elastic body 20 has an approximately frustoconical shape. The fastening part 26 of the first attachment member 16 is bonded by vulcanization to the small-diameter upper end of the main rubber elastic body 20, while the main rubber outer member 34 is bonded by vulcanization to the outer circumferential surface of the large-diameter lower end of the main rubber elastic body 20. In the first attachment member 16, a stopper rubber 44 integrally formed with the main rubber elastic body 20 is fastened to the outer circumferential surface and the upper surface of the stopper part 24. The main rubber outer member 34 is configured such that the entire inner circumferential surface of the first tubular part 36, the upper surface of the radially inner portion of the first outer flange 38, and the entire surface of the first inner flange 40 are fastened to the main rubber elastic body 20. The main rubber elastic body 20 includes a recess 46 opening onto the lower surface thereof on the radially inner side with respect to the first inner flange 40.

Figure 3:
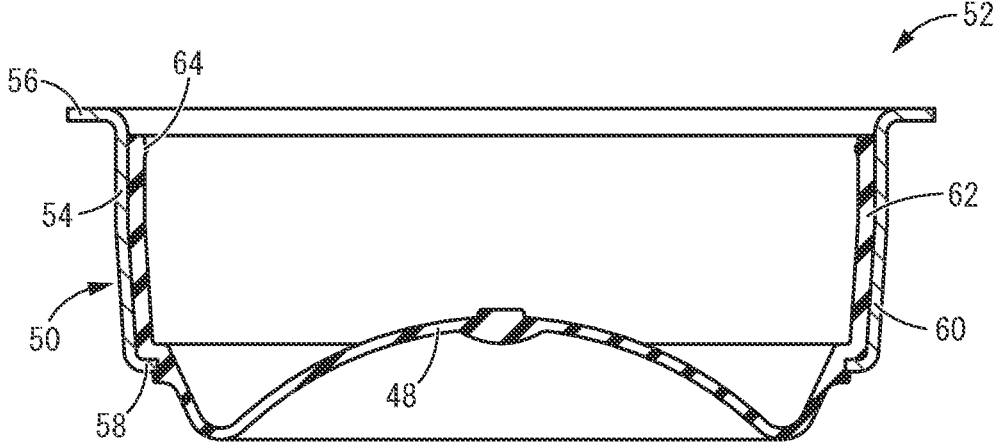
FIG. 3 is a cross sectional view of a second integrally vulcanization molded component constituting the engine mount shown in FIG. 1.

Besides, the mount body 12 includes a second integrally vulcanization molded component 52, in which a diaphragm outer fitting 50 serving as a drawing fitting is bonded by vulcanization to a flexible film 48 shown in FIG. 3. The flexible film 48 is configured such that the radially center portion has a thin-walled circular dome shape, while the radially outer portion has a longitudinal cross-sectional shape tilting upward toward the periphery, and the flexible film 48 is slack in the vertical direction.

The outer peripheral end of the flexible film 48 is fastened to a diaphragm outer fitting 50. The diaphragm outer fitting 50 integrally includes a second tubular part 54 having an approximately round tubular shape, a second outer flange 56 projecting radially outward at the upper side of the second tubular part 54, and a second inner flange 58 projecting radially inward at the lower side of the second tubular part 54. The outer peripheral end of the flexible film 48 is fastened to the second inner flange 58 of the diaphragm outer fitting 50. The second tubular part 54 is configured such that, in the state shown in FIG. 3 before the diameter reduction process described below, the axially lower portion serves as an expansion part 60 which becomes larger in diameter toward the top, and the upper portion above the expansion part 60 extends in the axial direction with an approximately constant diameter dimension.

The inner circumferential surface of the second tubular part 54 of the diaphragm outer fitting 50 is covered by a tubular sealing rubber 62, which is integrally formed with the flexible film 48. The upper end portion of the sealing rubber 62 is provided with a seal lip 64 protruding radially inward continuously over the entire circumference. The upper end of the sealing rubber 62 is located below the curved portion connecting the second tubular part 54 and the second outer flange 56 in the diaphragm outer fitting 50.

The first integrally vulcanization molded component 22 and the second integrally vulcanization molded component 52 thus constructed are mutually assembled by fixing the first tubular part 36 of the main rubber outer member 34 and the second tubular part 54 of the diaphragm outer fitting 50. More specifically, the first tubular part 36 is inserted axially into the second tubular part 54 from the upper side downward, and the upper part of the second tubular part 54, which is placed externally about the first tubular part 36, is reduced in diameter, whereby the upper part of the second tubular part 54 is fitted to the outer circumferential surface of the first tubular part 36. With this arrangement, the main rubber outer member 34 and the diaphragm outer fitting 50 are temporarily fixed, and the second attachment member 18 is composed of the main rubber outer member 34 and the diaphragm outer fitting 50. In the present practical embodiment, the direction of insertion of the first tubular part 36 into the second tubular part 54 is downward and the direction of dislodgment of the first tubular part 36 from the second tubular part 54 is upward.

With the main rubber outer member 34 and the diaphragm outer fitting 50 fitted and fixed together, the upper portion of the sealing rubber 62 is interposed between the first tubular part 36 and the second tubular part 54, and the first tubular part 36 and the second tubular part 54 are fitted together via the sealing rubber 62. Therefore, the sealing rubber 62 provides a sealing between the overlapped surfaces of the first tubular part 36 and the second tubular part 54.

Figure 4:
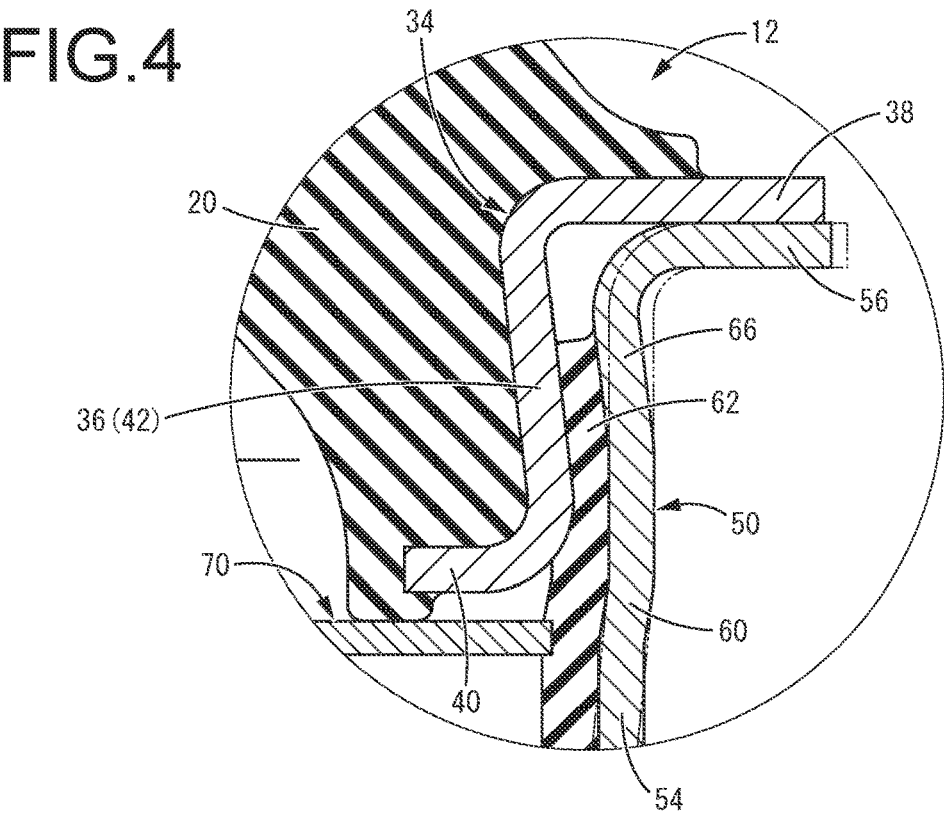
FIG. 4 is a cross sectional view of a part of a mount body constituting the engine mount shown in FIG. 1.

As shown in FIG. 4, the second tubular part 54 of the diaphragm outer fitting 50 includes a second tapered part 66 at the upper part, which is formed by a diameter reduction process and corresponds to the first tubular part 36 (the first tapered part 42) of the main rubber outer member 34. That is, above the expansion part 60 in the second tubular part 54, the second tapered part 66, which decreases in diameter toward the top, is formed by a diameter reduction process. In short, in the diameter reduction process of the diaphragm outer fitting 50, the level of diameter-reducing deformation in the upper end portion of the second tubular part 54 becomes larger toward the top. The inclination angle of the second tapered part 66 with respect to the axial direction may be different from that of the first tapered part 42, but is suitably the same as that of the first tapered part 42. As shown in FIG. 1, the expansion part 60 after the diameter reduction process is tapered at the upper end, while the lower part thereof is straight, extending with a constant diameter dimension. The diaphragm outer fitting 50 before the diameter reduction process is hypothetically shown in FIG. 4 by the chain double-dashed line.

In this way, the diameter reduction process is applied so as to form the second tapered part 66 at the upper end portion of the second tubular part 54. With this arrangement, when the force due to the diameter reduction process is transmitted from the upper end portion of the second tubular part 54 to the first tubular part 36, the downward component force acts on the first tubular part 36, and the relative movement of the first tubular part 36 in the upward direction, which is the direction of dislodgment from the second tubular part 54, is unlikely to occur. In the present practical embodiment, the portion of the first tubular part 36 where the second tubular part 54 is fitted serves as the first tapered part 42 that decreases in diameter toward the top. Thus, the downward component force acts more efficiently when the input during the diameter reduction process is transmitted from the second tubular part 54 to the first tubular part 36.

The first tapered part 42 is provided over the entire first tubular part 36. Thus, even if the second tapered part 66 is formed on the second tubular part 54 by the diameter reduction process in a state where the first tubular part 36 is covered by the second tubular part 54 and it is difficult to check the first tapered part 42 visually or the like, the second tapered part 66 can be formed in a position corresponding to the first tapered part 42, and the second tapered part 66 can be fitted to the first tapered part 42.

The sealing rubber 62 is interposed between the fitted surfaces of the first tapered part 42 of the first tubular part 36 and the second tapered part 66 of the second tubular part 54. This prevents damage to the fitted portions of the first tapered part 42 and the second tapered part 66, and also allows the input from the second tapered part 66 to be dispersed to the first tapered part 42 to act efficiently.

The sealing rubber 62 is sandwiched and compressed between the first tubular part 36 and the second tubular part 54, which results in a liquid-tight seal between the overlapped surfaces of the first tubular part 36 and the second tubular part 54 in the radial direction. In particular, in the present practical embodiment, the seal lip 64 is provided at the portion of the sealing rubber 62 that is in contact with the first tubular part 36, thereby stably obtaining the liquid-tightness.

In the assembly of the main rubber outer member 34 and the diaphragm outer fitting 50 by the diameter reduction process described above, the first outer flange 38 of the main rubber outer member 34 and the second outer flange 56 of the diaphragm outer fitting 50 may be in contact with each other in the vertical direction or may overlap each other with a slight separation. The first inner flange 40 of the main rubber outer member 34 and the second inner flange 58 of the diaphragm outer fitting 50 are apart from and opposed to each other in the vertical direction. The first tapered part 42 of the first tubular part 36 decreases in diameter toward the first outer flange 38, and the second tapered part 66 of the second tubular part 54 decreases in diameter toward the second outer flange 56.

A fluid chamber 68 is formed between the first integrally vulcanization molded component 22 and the second integrally vulcanization molded component 52. The fluid chamber 68 is provided axially between the main rubber elastic body 20 and the flexible film 48 on the radial inside of the second attachment member 18, and is liquid-tightly separated from the outside. The fluid chamber 68 is filled with a non-compressible fluid comprising a liquid such as water and ethylene glycol.

The fluid chamber 68 houses a partition 70. The partition 70 has an approximate disc shape overall, and has a structure in which a cover member 74 is attached to the upper surface of a partition main body 72.

The partition main body 72 has an approximate disc shape, and is formed of, for example, metal or a rigid synthetic resin. In the center portion of the partition main body 72, an approximately circular housing recess 76 is formed, which opens on the upper surface. In the outer circumferential portion of the partition main body 72, a circumferential groove 78 is formed so as to open on the upper surface and the outer circumferential surface and extend in the circumferential direction for a length less than once around the circumference. In the partition main body 72, the portion forming the circumferential groove 78 protrudes below the portion forming the housing recess 76 so as to have a larger vertical dimension.

The cover member 74 has an approximate disc shape with a thinner wall than the partition main body 72, and in the present practical embodiment, the cover member 74 is constituted by a metal plate. The cover member 74 is overlapped on the upper surface of the partition main body 72, and is fixed to the partition main body 72 by, for example, a fixing pin 80 that protrudes upwardly from the partition main body 72 being inserted into a fixing hole penetrating the cover member 74, and the distal end portion of the fixing pin 80 being enlarged in diameter in that state.

The housing recess 76, the opening of which is covered by the cover member 74, houses the movable film 82. The movable film 82 has an approximate disc shape and is formed of an elastic body such as rubber and resin elastomer. The movable film 82 is thick-walled in the vertical direction at the outer peripheral end and is made thinner at the center portion than at the outer peripheral end. The movable film 82 is inserted into the housing recess 76, with its thick-walled outer peripheral end being sandwiched and supported in the vertical direction between the bottom wall of the housing recess 76 and the cover member 74, while its thin-walled center portion being positioned apart from both the bottom wall of the housing recess 76 and the cover member 74 in the vertical direction so as to be allowed to deform in the vertical direction.

The partition 70 including the movable film 82 is arranged so as to spread in the fluid chamber 68 in the axis-perpendicular direction. The partition 70 is configured such that the outer peripheral end is inserted vertically between the first inner flange 40 of the main rubber outer member 34 and the second inner flange 58 of the diaphragm outer fitting 50, and the upper and lower surfaces are indirectly overlapped on those first and second inner flanges 40, 58, respectively, via rubber, so that the partition 70 is clasped by those first and second inner flanges 40, 58. Besides, the outer circumferential surface of the partition 70 is pressed against the sealing rubber 62 covering the inner circumferential surface of the diaphragm outer fitting 50, so that the outer circumferential surface of the partition 70 is supported by the diaphragm outer fitting 50, and the sealing rubber 62 provides a liquid-tight sealing between the overlapped surfaces of the outer circumferential surface of the partition 70 and the diaphragm outer fitting 50. The upper and lower surfaces of the outer peripheral end of the partition 70 are sealed by being pressed against the first and second inner flanges 40, 58 through the rubber by attachment of the second attachment member 18 and the outer bracket 14, as described below. However, the upper and lower surfaces of the outer peripheral end of the partition 70 may be sealed, for example, when the diaphragm outer fitting 50 is fitted to the main rubber outer member 34.

By the partition 70 being arranged in the fluid chamber 68, the fluid chamber 68 is bifurcated into upper and lower parts. The upper part of the fluid chamber 68 above the partition 70 forms a pressure-receiving chamber 84 whose wall is partially defined by the main rubber elastic body 20 and which gives rise to internal pressure fluctuations at times of vibration input. In addition, the lower part of the fluid chamber 68 below the partition 70 forms an equilibrium chamber 86 whose wall is partially defined by the flexible film 48 and which permits changes in volume due to the deformation of the flexible film 48. In short, the pressure-receiving chamber 84 and the equilibrium chamber 86 are partitioned by the partition 70. Both the pressure-receiving chamber 84 and the equilibrium chamber 86 are filled with the non-compressible fluid described above.

The pressure-receiving chamber 84 and the equilibrium chamber 86 are interconnected by an orifice passage 88 comprising the circumferential groove 78. That is, the circumferential groove 78 is tunnel-shaped by its upper opening being covered by the cover member 74 while its outer peripheral opening being covered by the diaphragm outer fitting 50. The circumferential groove 78 is configured such that one end communicates with the pressure-receiving chamber 84 through a first communication hole 90 formed in the cover member 74, while the other end communicates with the equilibrium chamber 86 through a second communication hole 92 formed in the partition main body 72. With this configuration, the orifice passage 88, which interconnects the pressure-receiving chamber 84 and the equilibrium chamber 86, is constituted by the circumferential groove 78 extending in the outer peripheral end of the partition 70 in the circumferential direction. In the orifice passage 88, the resonance frequency of the flowing fluid (the tuning frequency), which is tuned based on the ratio of the passage length to the passage cross-sectional area, is tuned and set to a low frequency, corresponding to engine shake. When low-frequency, large-amplitude vibration such as engine shake is input across the first attachment member 16 and the second attachment member 18, fluid flow through the orifice passage 88 between the pressure-receiving chamber 84 and the equilibrium chamber 86 actively occurs in a resonant state based on the relative internal pressure differential between the pressure-receiving chamber 84 and the equilibrium chamber 86, thereby exhibiting vibration damping effect (high attenuating action) based on the flow action of the sealed liquid.

The movable film 82 arranged in the housing recess 76 of the partition 70 receives the liquid pressure of the pressure-receiving chamber 84 on its upper surface and the liquid pressure of the equilibrium chamber 86 on its lower surface. That is, the portion of the cover member 74 covering the opening of the housing recess 76 is vertically penetrated by a plurality of first through holes 94, and the upper surface of the center portion of the movable film 82 receives the liquid pressure of the pressure-receiving chamber 84 through the first through holes 94. Meanwhile, the bottom wall of the housing recess 76 is vertically penetrated by a plurality of second through holes 96, and the lower surface of the center portion of the movable film 82 receives the liquid pressure of equilibrium chamber 86 through the second through holes 96. The center portion of the movable film 82 is deformable in the vertical direction based on the relative liquid pressure differential between the pressure-receiving chamber 84 and the equilibrium chamber 86. When medium- to high-frequency, small-amplitude vibration such as idling vibration and booming noise is input across the first attachment member 16 and the second attachment member 18, the movable film 82 slightly deforms in the thickness direction based on the relative internal pressure difference between the pressure-receiving chamber 84 and the equilibrium chamber 86. This exhibits vibration damping effect (low dynamic spring action) based on the liquid pressure-absorbing action that transmits the internal pressure of the pressure-receiving chamber 84 to the equilibrium chamber 86 for absorption.

Meanwhile, the mount body 12 can be manufactured, for example, by the following steps.

Specifically, first, the first attachment member 16 and the main rubber outer member 34 including the first tubular part 36 are prepared. Then, the prepared first attachment member 16 and main rubber outer member 34 are set in a mold for molding the main rubber elastic body 20. The main rubber elastic body 20 is vulcanization molded to form the first integrally vulcanization molded component 22.

The diaphragm outer fitting 50 including the second tubular part 54 is also prepared. The prepared diaphragm outer fitting 50 is then set in a mold for molding the flexible film 48. The flexible film 48 is vulcanization molded to form the second integrally vulcanization molded component 52.

Next, after inserting the separately prepared partition 70 into the radial inside of the diaphragm outer fitting 50 of the second integrally vulcanization molded component 52 from above downward, the first integrally vulcanization molded component 22 is inserted into the radial inside of the diaphragm outer fitting 50 from above downward. In other words, by inserting the first tubular part 36 of the main rubber outer member 34, which constitutes the first integrally vulcanization molded component 22, into the second tubular part 54 of the diaphragm outer fitting 50 into which the partition 70 has been inserted, the diaphragm outer fitting 50 is attached to the main rubber outer member 34.

Then, the upper part of the second tubular part 54 of the diaphragm outer fitting 50 is reduced in diameter to form the second tapered part 66, and the second tapered part 66 is pressed against the first tapered part 42 of the first tubular part 36 to be fitted and fixed thereto. By so doing, the first integrally vulcanization molded component 22, the second integrally vulcanization molded component 52, and the partition 70 are interconnected to obtain the mount body 12 including the fluid chamber 68 inside.

When fitting and fixing the main rubber outer member 34 and the diaphragm outer fitting 50, the second tapered part 66 is pressed against the first tapered part 42, so that the main rubber outer member 34 (the first integrally vulcanization molded component 22) is less likely to be dislodged from the diaphragm outer fitting 50 (the second integrally vulcanization molded component 52) upward, namely, in the direction of dislodgment which is opposite to the direction of insertion. Therefore, the main rubber outer member 34 (the first integrally vulcanization molded component 22) and the diaphragm outer fitting 50 (the second integrally vulcanization molded component 52) can be positioned with respect to each other in the axial direction.

The step of inserting the partition 70 and the first integrally vulcanization molded component 22 into the second integrally vulcanization molded component 52 and the step of reducing the diaphragm outer fitting 50 in diameter mentioned above can be suitably performed in a non-compressible fluid so that the fluid chamber 68 formed inside is filled with the non-compressible fluid.

Regarding the mount body 12 as described above, the outer bracket 14 serving as a caulking fitting is attached to the second attachment member 18. The outer bracket 14 in the present practical embodiment comprises a stopper fitting 98 covering the upper side of the mount body 12, and a connecting member 100 covering the lower side of the mount body 12.

The stopper fitting 98 is a high rigidity component formed of metal, and has an approximately round tubular shape overall. The upper end of the stopper fitting 98 is provided with an inner flange-shaped stopper receiver 102 protruding radially inward. The lower end of the stopper fitting 98 is provided with an outer flange-shaped stepped part 104 extending radially outward, and a tubular caulking piece 106 protruding downward from the outer peripheral end of the stepped part 104. The caulking piece 106 is preferably slightly thin-walled toward the protruding distal end.

The connecting member 100 is a high rigidity component formed of metal or the like, and has an approximately round tubular shape with a bottom. A connecting bolt 108 is fixed by press-fitting to the bottom wall of the connecting member 100 and protrudes downward. The upper end of the connecting member 100 is provided with an outer flange-shaped connecting flange 110 protruding radially outward. The connecting flange 110 is configured such that the lower part of the outer peripheral end face serves as a caulking receiving surface 112 that slopes radially inward toward the bottom.

The outer bracket 14 is fixed to the second attachment member 18 of the mount body 12. Specifically, the caulking piece 106 of the stopper fitting 98 is placed externally about the first outer flange 38 of the main rubber outer member 34 and the second outer flange 56 of the diaphragm outer fitting 50, while the stepped part 104 of the stopper fitting 98 is overlapped on the first outer flange 38 from the upper side. Besides, the upper end of the connecting member 100 is inserted into the radial inside of the caulking piece 106, and is overlapped on the second outer flange 56 from the lower side. Then, the lower end of the caulking piece 106 is bent to the radially inner side, and is fastened by caulking to the caulking receiving surface 112 of the connecting flange 110 of the connecting member 100.

By the stopper fitting 98 and the connecting member 100 being fastened by caulking, the first outer flange 38 of the main rubber outer member 34 and the second outer flange 56 of the diaphragm outer fitting 50 are sandwiched between the stepped part 104 of the stopper fitting 98 and the connecting flange 110 of the connecting member 100. In this manner, the outer bracket 14 is attached to the second attachment member 18 by the outer bracket 14 being fastened by caulking to the first outer flange 38 and the second outer flange 56.

By pressing the caulking piece 106 against the caulking receiving surface 112, force in the direction of mutual approach in the vertical direction is exerted between the stopper fitting 98 and the connecting member 100, and the first outer flange 38 and the second outer flange 56 of the second attachment member 18 are urged in the direction of approach to come into contact with each other. By so doing, the main rubber outer member 34 and the diaphragm outer fitting 50 are positioned in appropriate relative positions in the vertical direction, and stabilization in the shape of the second attachment member 18 is achieved.

In the isolated state of the mount body 12 before the outer bracket 14 is attached, the main rubber outer member 34 and the diaphragm outer fitting 50 are prevented from being significantly shifted in relative position in the vertical direction by the fitting of the first and second tapered parts 42, 66. Hence, for example, the situation in which the first outer flange 38 and the second outer flange 56 become greatly separated to make it difficult to fasten the caulking piece 106 by caulking to the connecting flange 110 will not occur, and the attachment of the outer bracket 14 to the mount body 12 is realized in a stable manner. Therefore, according to the engine mount 10, high dimensional accuracy in the vertical direction, stabilization of vibration damping performance by reliably obtaining liquid tightness at the outer peripheral end of the partition 70, and the like are realized.

The main rubber outer member 34 and the diaphragm outer fitting 50 are firmly positioned in a state of contact by fastening the first outer flange 38 and the second outer flange 56 by caulking with the outer bracket 14 serving as the caulking fitting. With this arrangement, the relative positions of the first integrally vulcanization molded component 22 including the main rubber outer member 34 and the second integrally vulcanization molded component 52 including the diaphragm outer fitting 50 are precisely set. Therefore, for example, the first and second inner flanges 40, 58 are pressed against the outer peripheral end of the partition 70 with a predetermined force in the axial direction to reliably obtain liquid tightness between the first and second inner flanges 40, 58 and the partition 70, and also to prevent the generation of noise due to rattling of the partition 70 or the like. In this way, in a fluid-filled vibration damping device where the relative axial positions of the main rubber outer member 34 and the diaphragm outer fitting 50 are likely to affect vibration damping performance, liquid tightness, quietness, etc., it is possible to obtain the desired performance in a stable manner by providing a mechanism to prevent dislodgment through the fitting of the first and second tapered parts 42, 66.

In the engine mount 10, the first inner flange 40 is indirectly overlapped on the upper surface of the partition 70 via a part of the main rubber elastic body 20 fastened to the lower surface of the first inner flange 40, and the said part of the main rubber elastic body 20 serves as a seal rubber that provides a sealing between the overlapped surfaces of the first inner flange 40 and the partition 70. Besides, the second inner flange 58 is indirectly overlapped on the lower surface of the partition 70 via the outer peripheral end of the flexible film 48 fastened to the upper surface of the second inner flange 58, and the said outer peripheral end of the flexible film 48 serves as a seal rubber that provides a sealing between the overlapped surfaces of the second inner flange 58 and the partition 70.

Figure 5:
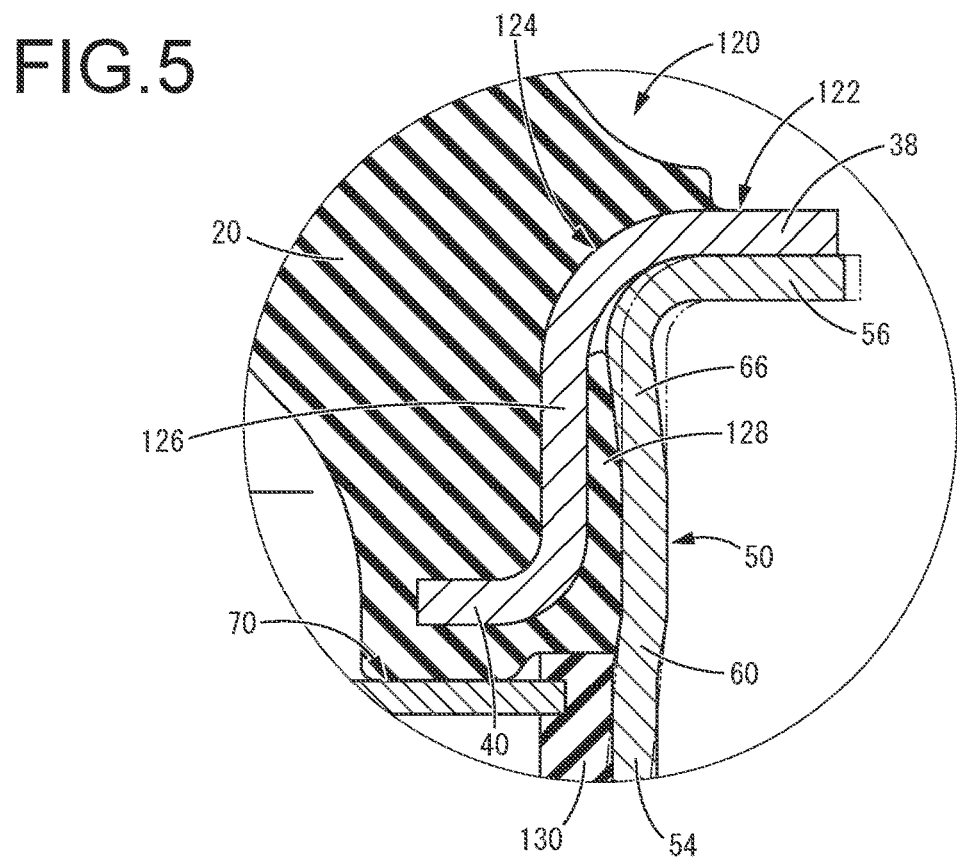
FIG. 5 is a cross sectional view of a part of a mount body constituting an engine mount as another practical embodiment of the present disclosure.

FIG. 5 shows a part of a mount body 120 constituting an engine mount serving as a second practical embodiment of the present disclosure. The mount body 120 is configured such that a second attachment member 122 comprises a main rubber outer member 124 and the diaphragm outer fitting 50. In the following description, components and parts that are substantially identical with those in the first practical embodiment will be assigned like symbols and not described in any detail. In addition, the portions that are not shown in FIG. 5 are the same as those in the first practical embodiment.

The main rubber outer member 124 of the present practical embodiment has an approximately round tubular shape in which the first tubular part 36 extends without inclination with respect to the axial direction and is not provided with the first tapered part as in the first practical embodiment. A sealing rubber 128, which is integrally formed with the main rubber elastic body 20, is fastened to the outer circumferential surface of a first tubular part 126. The sealing rubber 128 has an approximately constant thickness dimension in the isolated state of the first integrally vulcanization molded component 22. Since the sealing rubber 128 is provided on the main rubber outer member 124 side, a sealing rubber 130 fastened to the inner circumferential surface of the second tubular part 54 of the diaphragm outer fitting 50 is located below the sealing rubber 128.

The main rubber outer member 124 and the diaphragm outer fitting 50 are fitted and fixed by diameter reduction of the second tubular part 54. Specifically, the upper part of the second tubular part 54 of the diaphragm outer fitting 50 is placed externally about the first tubular part 126 of the main rubber outer member 124. Then, the externally placed portion of the second tubular part 54 about the first tubular part 126 is reduced in diameter, so that the second tubular part 54 is pressed against the first tubular part 126 via the sealing rubber 128, whereby the diaphragm outer fitting 50 is fitted and fixed to the main rubber outer member 124.

The second tubular part 54 in the diaphragm outer fitting 50 is reduced in diameter with a larger level of diameter-reduction deformation toward the top so that the upper part decreases in diameter toward the top. By so doing, in the diaphragm outer fitting 50 after the diameter reduction process, the second tapered part 66 serving as the tapered part that decreases in diameter toward the top is formed at the upper part of the second tubular part 54.

During the diameter reduction process, the second tapered part 66 is pressed against the sealing rubber 128 interposed between the first tubular part 126 and the second tubular part 54. By so doing, the force of the diameter reduction process input to the second tapered part 66 acts on the main rubber outer member 124 not only as a radially inward force but also as a downward force. Therefore, during the diameter reduction process, the main rubber outer member 124 is prevented from being lifted upward with respect to the diaphragm outer fitting 50, and the main rubber outer member 124 and the diaphragm outer fitting 50 are positioned in appropriate relative positions in the axial direction.

In this way, in the case where the sealing rubber 128 is interposed between the first tubular part 126 and the second tubular part 54, the tapered part 66 provided on the second tubular part 54 alone, without providing the tapered part on the first tubular part 126, can exert a downward force on the main rubber outer member 124 during the diameter reduction process of the second tubular part 54.

It is desirable that the sealing rubber interposed between the first tubular part 126 and the second tubular part 54 be fastened to the outer circumferential surface of the first tubular part 126. However, the said sealing rubber may be fastened to the inner circumferential surface of the second tubular part 54 and pressed against the outer circumferential surface of the first tubular part 126, as in the first practical embodiment, for example. In this case as well, the first tubular part 126, which lacks the tapered part, allows a component force in the downward direction to act on the main rubber outer member 124.

While the present disclosure has been described in detail hereinabove in terms of the practical embodiments, the disclosure is not limited by the specific description thereof. For example, when the first and second tubular parts are each provided with the tapered part like the first tubular part 36 and the second tubular part 54 of the first practical embodiment, the tapered part 42 of the first tubular part 36 and the tapered part 66 of the second tubular part 54 may be directly overlapped and fitted together without interposing the sealing rubber.

In the first practical embodiment, the structure in which the first tapered part 42 is provided over the entire length of the first tubular part 36 is illustrated, but the first tapered part 42 may be provided partially in the first tubular part 36. Besides, in the first practical embodiment, the structure in which the second tapered part 66 is partially provided at the upper end of the second tubular part 54 is illustrated, but the second tapered part 66 may be provided over the entire length of the second tubular part 54.

The outer bracket 14 is not essential, and the main rubber outer member and the drawing fitting need not necessarily be positioned by being urged in the direction of approaching in the vertical direction by means of caulk fastening of the outer bracket 14. For example, the main rubber outer member and drawing fitting can also be positioned with respect to each other by fitting the drawing fitting to the main rubber outer member by diameter reduction of the drawing fitting.

The present disclosure is not limited to implementation in vibration damping devices as in the preceding practical embodiments, but can also be implemented in solid type vibration damping devices. When implemented in solid type vibration damping devices, the drawing fitting can be constituted by components other than the diaphragm outer fitting, such as a metal bracket, for example.

What is claimed is:

1. A vibration damping device comprising:
a first attachment member;
a second attachment member; and
a main rubber elastic body connecting the first and second attachment members, wherein
the second attachment member comprises:
   a main rubber outer member including a first tubular part fastened to an outer peripheral end of the main rubber elastic body; and
   a drawing fitting including a second tubular part attached externally about the first tubular part of the main rubber outer member,
the first tubular part of the main rubber outer member is inserted in the second tubular part of the drawing fitting in an axial direction, and the second tubular part is reduced in diameter to be fitted to an outer circumferential surface of the first tubular part,
fitted portions of the first tubular part and the second tubular part include respective tapered parts decreasing in diameter in a direction of dislodgment that is opposite to a direction of insertion of the first tubular part in the second tubular part,
the first tubular part of the main rubber outer member includes a first outer flange projecting radially outward at an upper axial end of the first tubular part,
the first tubular part of the main rubber outer member includes a first inner flange projecting radially inward at the lower axial end of the first tubular part,
the first tubular part overall from the lower end to an upper end serves as the tapered part that decreases in diameter toward a top,
the second tubular part of the drawing fitting includes a second outer flange projecting radially outward at the upper axial end of the second tubular part, and
a caulking fitting is provided such that the first outer flange and the second outer flange that are overlapped on each other in a state of contact are fixed by caulking by the caulking fitting.

2. The vibration damping device according to claim 1, wherein a sealing rubber is interposed between overlapped surfaces of the tapered parts.

3. The vibration damping device according to claim 1, further comprising:
a sealing rubber interposed between the first tubular part and the second tubular part,
the second tubular part reduced in diameter to be pressed against the sealing rubber and fitted to an outer circumferential surface of the first tubular part, and
a portion of the second tubular part that is in contact with the sealing rubber includes a tapered part decreasing in diameter in a direction of dislodgment that is opposite to a direction of insertion of the first tubular part in the second tubular part.

4. The vibration damping device according to claim 1, the vibration damping device comprising a fluid-filled vibration damping device comprising:
a pressure-receiving chamber whose wall is partially defined by the main rubber elastic body and an equilibrium chamber whose wall is partially defined by a flexible film, the pressure-receiving chamber and the equilibrium chamber being filled with a non-compressible fluid; and
an orifice passage interconnecting the pressure-receiving chamber and the equilibrium chamber, wherein
the drawing fitting comprises a diaphragm outer fitting fastened to an outer peripheral end of the flexible film.

5. The vibration damping device according to claim 4, wherein
the first tubular part of the main rubber outer member includes a first inner flange projecting radially inward at a lower end of the first tubular part,
the second tubular part of the drawing fitting includes a second inner flange projecting radially inward at a lower end of the second tubular part, and
the first inner flange and the second inner flange are apart from and opposed to each other in a vertical direction, and a partition partitioning the pressure-receiving chamber and the equilibrium chamber is clasped between the opposed first and second inner flanges.

6. The vibration damping device according to claim 3, the vibration damping device comprising a fluid-filled vibration damping device comprising:
a pressure-receiving chamber whose wall is partially defined by the main rubber elastic body and an equilibrium chamber whose wall is partially defined by a flexible film, the pressure-receiving chamber and the equilibrium chamber being filled with a non-compressible fluid; and
an orifice passage interconnecting the pressure-receiving chamber and the equilibrium chamber, wherein
the drawing fitting comprises a diaphragm outer fitting fastened to an outer peripheral end of the flexible film.

7. The vibration damping device according to claim 6, wherein
the first tubular part of the main rubber outer member includes a first inner flange projecting radially inward at a lower end of the first tubular part,
the second tubular part of the drawing fitting includes a second inner flange projecting radially inward at a lower end of the second tubular part, and
the first inner flange and the second inner flange are apart from and opposed to each other in a vertical direction, and a partition partitioning the pressure-receiving chamber and the equilibrium chamber is clasped between the opposed first and second inner flanges.

8. A method of manufacturing a vibration damping device including a first attachment member and a second attachment member connected by a main rubber elastic body, the method comprising:
preparing a main rubber outer member including a first tubular part to be fastened to an outer peripheral end of the main rubber elastic body, and a drawing fitting including a second tubular part to be attached externally about the first tubular part of the main rubber outer member;

inserting the first tubular part into the second tubular part and attaching the drawing fitting to the main rubber outer member; and performing a drawing operation on the second tubular part to impart tapered contours at a portion of the second tubular part that is overlapped on the first tubular part thereby forming a tapered part on the second tubular part, the tapered part decreasing in diameter in a direction of dislodgment that is opposite to a direction of insertion of the first tubular part into the second tubular part, while fitting and fixing the tapered part to an outer circumferential surface of the first tubular part to position the main rubber outer member and the drawing fitting with respect to each other in an axial direction, wherein the first tubular part of the main rubber outer member includes a first outer flange projecting radially outward at an upper axial end of the first tubular part, the first tubular part of the main rubber outer member includes a first inner flange projecting radially inward at a lower axial end of the first tubular part, the first tubular part overall from the lower end to an upper end serves as the tapered part that decreases in diameter toward a top, the second tubular part of the drawing fitting includes a second outer flange projecting radially outward at the upper axial end of the second tubular part, and a caulking fitting is provided such that the first outer flange and the second outer flange that are overlapped on each other in a state of contact are fixed by caulking by the caulking fitting.

\* \* \* \* \*